United States Patent [19]

Cox

[11] Patent Number: 4,864,762

[45] Date of Patent: Sep. 12, 1989

[54] LINE TYING DEVICE

[76] Inventor: Daniel D. Cox, 7816 Center St., Mohave Valley, Ariz. 86440

[21] Appl. No.: 226,447

[22] Filed: Aug. 1, 1988

[51] Int. Cl.$^4$ .............................................. A01K 97/06
[52] U.S. Cl. .................................................. 43/4; 43/1; 289/17
[58] Field of Search ............................. 43/1, 4; 289/17

[56] References Cited

U.S. PATENT DOCUMENTS

| | | | |
|---|---|---|---|
| 2,689,147 | 9/1954 | Smalley | 289/17 |
| 2,758,858 | 8/1956 | Smith | 43/1 |
| 2,926,036 | 2/1960 | Wimberley | 289/17 |
| 3,106,417 | 10/1963 | Clow | 289/17 |
| 3,177,021 | 4/1965 | Benham | 289/17 |
| 4,101,152 | 7/1978 | Gardipee | 43/4 |
| 4,660,314 | 4/1987 | Janssen | 43/4 |

FOREIGN PATENT DOCUMENTS 1092879  2/1954  France ........................................ 43/1

Primary Examiner—Kurt Rowan
Attorney, Agent, or Firm—Boniard I. Brown

[57] ABSTRACT

A line tying device especially useful for tying a fish line to a fish hook or to another fish line. The line is helically wound a number of times around a mandrel body; the free end of the line is then passed through a groove in the mandrel body into the space circumscribed by the helical windings. A depression in the tip end area of the mandrel body keeps the helical winding in place; after the windings have been formed a pulling force may be exerted on the free end of the line to draw the wound area (knot) off of the mandrel body.

14 Claims, 2 Drawing Sheets

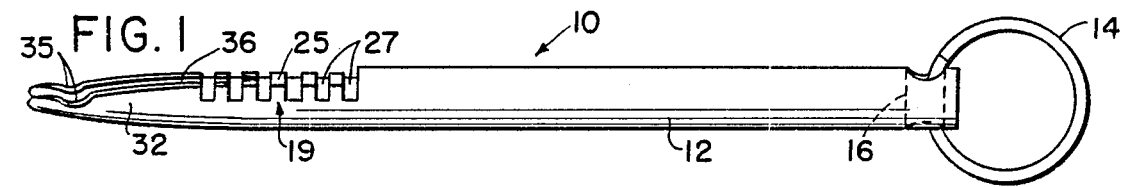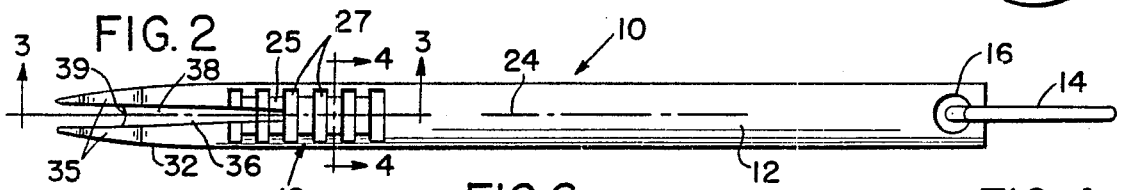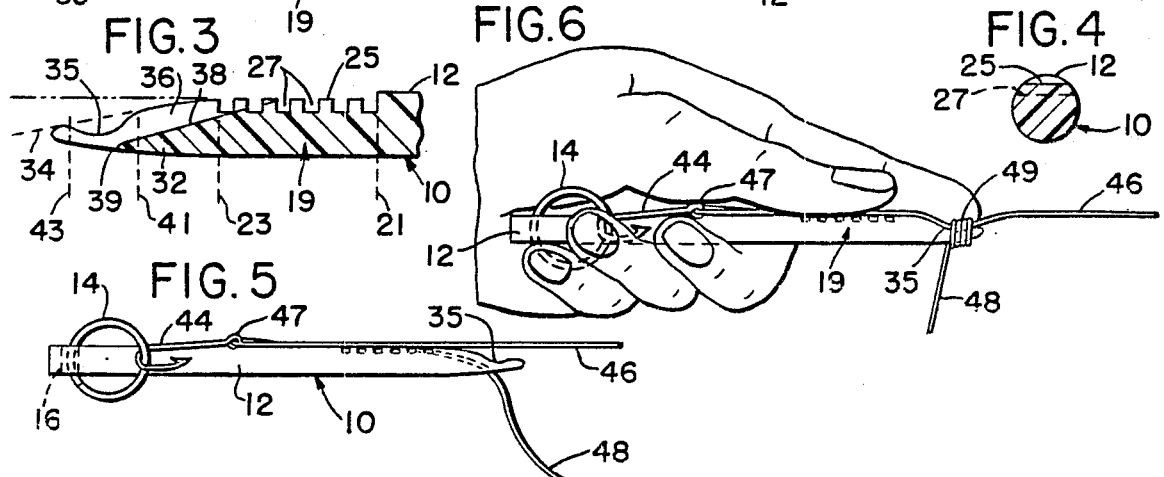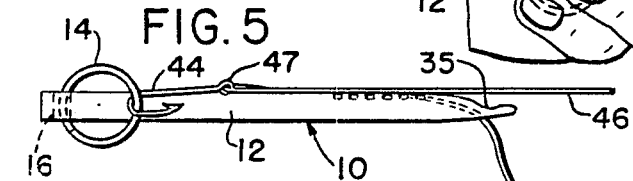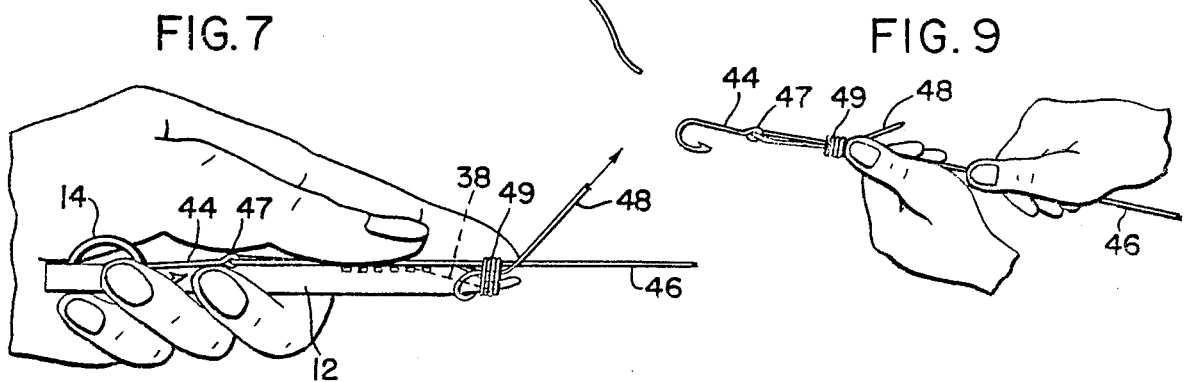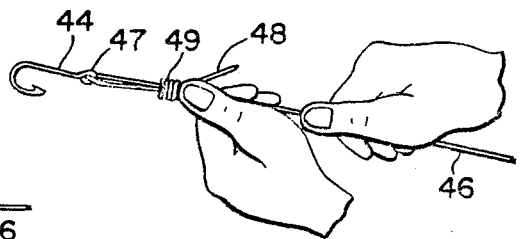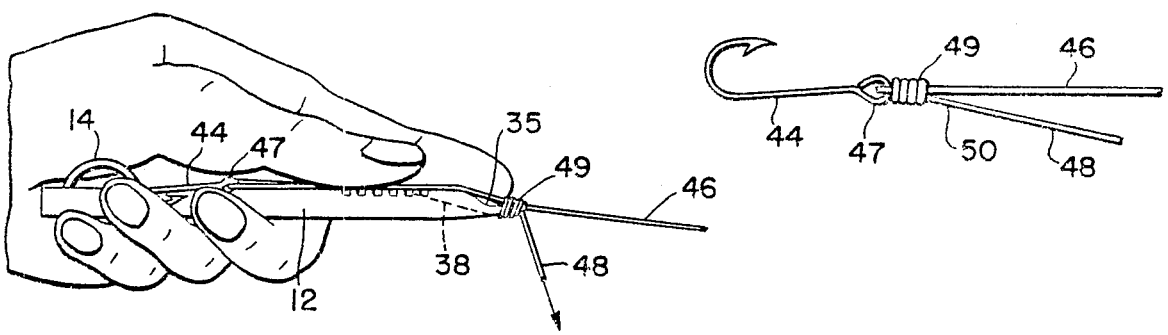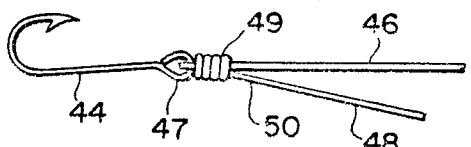

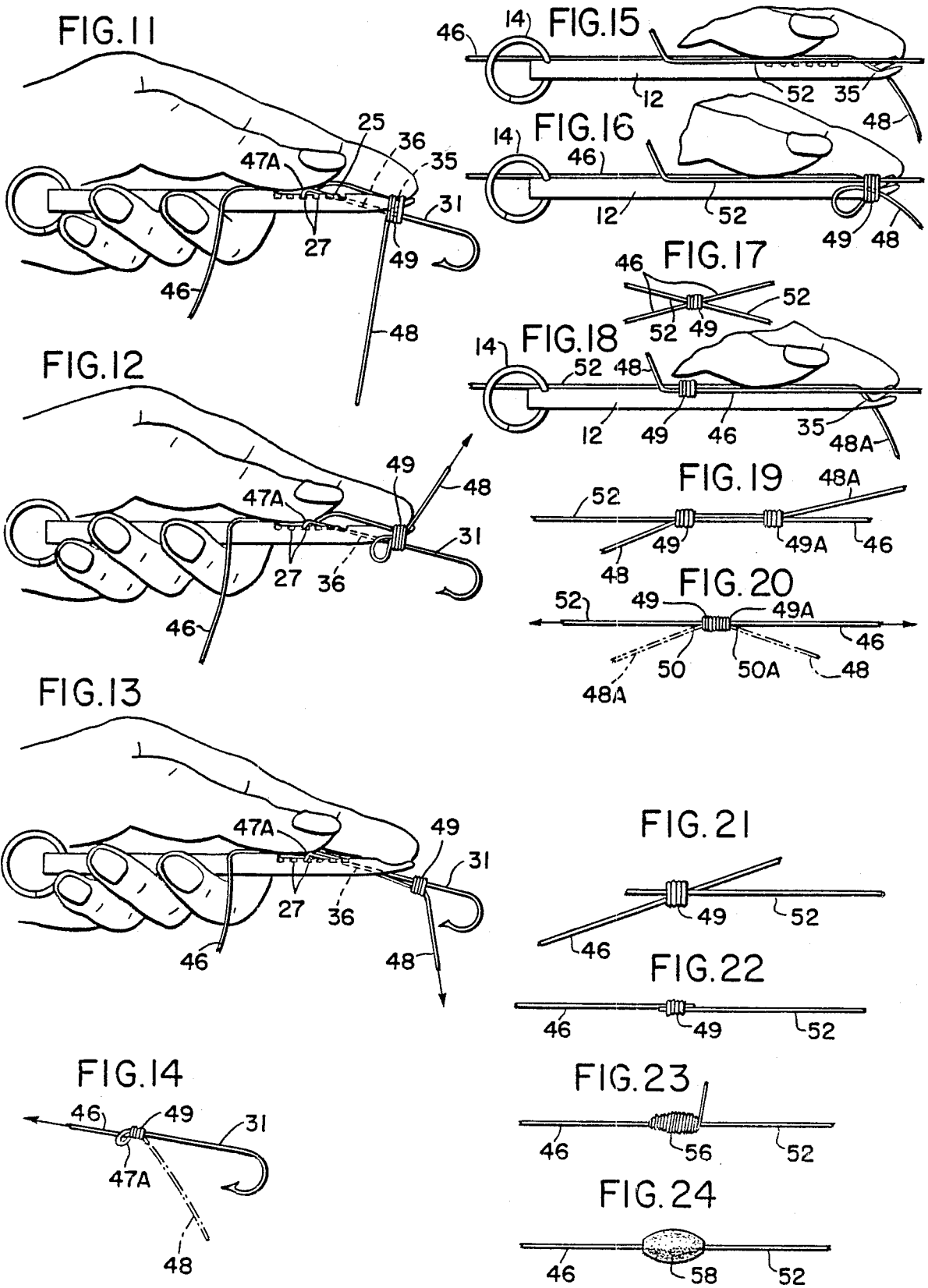

LINE TYING DEVICE

BACKGROUND OF THE INVENTION

This invention relates to a device for tying a fish line to another fish line or to a fish hook (depending on user needs).

Prior to my invention others have suggested devices for tying knots in fish lines. U.S. Pat. No. 3,494,648 to H. Stephens shows a line-tying device that includes an elongated straight-sided mandrel body having a longitudinal groove 18 that terminates in a notch 19. Two lines can be extended through the groove; apparently one of the lines can be turned downwardly through notch 19 and then wrapped helically around the elongated body. the tail (free) end of the line can then be extended into groove 18 and through the space circumscribed by the wrap-around sections of the line. The tail end of the line is pulled to draw the line off of the elongated body.

SUMMARY OF THE INVENTION

My invention offers an alternative to the device disclosed in the above-mentioned U.S. Pat. No. 3,494,648. In my proposed arrangement the mandrel body is formed to have a convergent nose section (in contrast to the straight-sided structure shown in U.S. Pat. No. 3,494,648). A relatively wide shallow transverse depression is formed in the upper surface of the convergent nose section to accommodate the wrap-around sections of the line. The shallow depression keeps the helical sections of the line from inadvertently slipping off the convergent end of the mandrel body during the wrap-around process. The shallow transverse depression is located in immediate proximity to the tip of the mandrel nose section, whereby the helical sections of the line can be readily drawn off the mandrel at completion of a line-tying operation.

In a preferred embodiment of my invention the mandrel body has a longitudinal groove in its side surface for guiding the tail end of a fish line into the space circumscribed by helically wound sections of a line. The bottom surface of the longitudinal groove is acutely angled to the mandrel axis for improved guidance of the line into the helically wound line sections.

I have designed the mandrel body so that a snelled fish hook can be positioned in the aforementioned longitudinal groove at a slight angle to the mandrel body axis. Transverse grooves are formed in an upper face of the mandrel to receive the eye of the fish hook, whereby a monofilament line can be wound around the mandrel body and shank area of the hook. A tail end of the line can then be pulled to draw the wound line off of the mandrel body onto the shank area of the hook.

An important object of the invention is to provide a tying device that can be used on a variety of different types of fish hooks and lines. A further object is to provide a tying device that can be used to consistently form good strong knots in the line. A related object is to provide a tying device wherein the formed knot is easily and smoothly slipped off of the mandrel body.

THE DRAWINGS

FIG. 1 is essentially a side elevational view of a tying device embodying my invention. FIG. 1 is taken with the device in a slightly tilted attitude.

FIG. 2 is a top plan view of the device shown in FIG. 1.

FIG. 3 and 4 are sectional views taken respectively on lines 3—3 and 4—4 in FIG. 2.

FIGS. 5 through 8 are views illustrating different steps or stages during usage of the FIG. 1 device to tie a monofilament line to a fish hook.

FIG. 9 illustrates a final step in forming a knot in the line after the line has been removed from the mandrel.

FIG. 10 shows the knot in its final form.

FIGS. 11 through 13 illustrate various steps employed when the FIG. 1 device is used to tie a leader (line) to a snelled hook.

FIG. 14 shows the completed knot obtained by using the steps illustrated in FIGS. 11 through 13.

FIGS. 15 through 18 show the FIG. 1 device when used to tie two lines together in a double knot relationship.

FIGS. 19 and 20 illustrate the knots formed by the apparatus of FIGS. 15 through 18.

FIGS. 21 through 24 show various stages in the formation of a single knot line connection, using the FIG. 1 device.

DESCRIPTION OF A PREFERRED EMBODIMENT OF THE INVENTION

FIG. 1 through 4 illustrate a preferred embodiment of the invention. The illustrated device comprises an elongated mandrel body 10 having a cylindrical section 12 adapted to be held in the palm area of the user's hand, as shown in FIG. 6; the user's last three fingers can be curled around cylindrical section 12. Section 12 need not have a cylindrical cross-section, but it should have curved side surfaces for a comfortable fit in the user's hand.

A ring structure 14 extends through a transverse hole 16 in the right end of the mandrel for swinging movement to a position against either side surface of cylindrical section 12, depending on whether the user is left-handed or right-handed. FIGS. 5 and 6 illustrate the device as used by a right-handed person (the device is held in the user's left hand).

A thumb-engageable section 19 extends axially from section 12 a short distance, sufficient to make significant area contact with the user's thumb, as shown in FIG. 6. Section 19 may be visualized as the section between imaginary planes 21 and 23 (FIG. 3). Mandrel body sections 12 and 19 are generally co-axial around longitudinal axis 24, except that the upper face 25 of section 19 is slightly below the upper surface of section 12, as seen in FIGS. 3 and 4.

The upper face 25 of section 19 is flat (as seen in FIGS. 3 and 4) so that it can have good surface contact with a amonofilament line and the user's thumb. The thumb is pressed down against flat face 25 to frictionally retain the line against sliding movement. Transverse grooves 27 are formed in face 25 to enhance the frictional retention action. The edges of grooves 27 tend to dig into the line to form small kinks that minimize the tendency of the line to slide on surface 25. As seen in FIG. 11, grooves 27 are of sufficient width and depth to receive the eye of a snelled hook 31.

The extreme left end of the mandrel body comprises a covergent nose section 32. Side surface areas of section 32 follow the curvatures on section 19 but are slightly convergent as shown in FIG. 2. The upper side surface of nose section 32 angles downwardly at a slight angle of about eight degrees relative to face 25, as indicated by dashed line 34.

A transverse depression 35 is formed in the nose section upper surface. As seen in FIG. 3, depression 35 is relatively wide and comparatively shallow (i.e. the width of the depression is much greater than its depth). At the deepest point depression 35 has a depth that is about one half the thickness of nose section 32 (taken in a vertical transverse plane). The concave bottom surface of depression 35 merges smoothly into the surface contour on nose section 32 to facilitate removal of the line from the mandrel body.

As best seen in FIG. 6, depression 35 accommodates the helical windings of a monofilament fish line during the formation of the knot in the line. The concavity provided by depression 35 prevents the line from prematurely sliding off the end of the mandrel. Smooth contouring of the depression surface allows the wound sections of the line to be drawn off the mandrel after the knot is formed, as seen in FIG. 8.

A longitudinal groove 36 extends vertically through nose section 32 and partway into mandrel section 19. The bottom surface 38 of the groove is at an acute angle to mandrel axis 24 and flat face 25; the preferred angle is about seventeen degrees. The left end of groove surface 38 terminates on the nose section undersurface at a point 39 lying within the general plane of depression 35, as defined by imaginary lines 41 and 43 in FIG. 3.

FIGS. 5 through 7 illustrate one way that the device can be used to connect a monofilament fish line to a conventional fish hook 44. A similar procedure can be used to connect the line to a fish lure. Initially the hook is engaged with ring structure 14, and a fish line 46 is looped one or more times through eye 47 of the fish hook, as shown in FIG. 5. A tail (free) end 48 of at least six inches is left to form a knot in the line.

Tail end 48 is drawn through groove 36 to extend along groove bottom surface 38, as shown in FIG. 5. The mandrel body is held in the user's hand as shown in FIG. 6; at the same time the tail end 48 of the line is wound in helical fashion three or four times around the outer surface of nose section 32. Depression 35 keeps the helical windings 49 from slipping off the mandrel body.

The free end of the line is then inserted into groove 38 in a left-to-right direction (FIG. 7); the angulation of groove surface 38 guides the end of the line along the surface and into the space circumscribed by windings 49. FIG. 7 shows a subsequent condition wherein the line is being pulled upwardly and rightwardly, as viewed. As the tail end 48 of the line is pulled in this direction, the line in the area of depression 35 is allowed to slip between the mandrel and the helical winding, this slipping being made easier by the depression 35, and the line comes out the bottom of the device at the point 39 (FIG. 5). While maintaining firm pressure with the index finger on the helical windings, a downward pull away from the device, in the manner shown in FIG. 8, permits the knot to slip off the mandrel easily. The device of the invention and this method provide a stronger and different knot than knots of the prior art.

The formed knot may be tightened on eye 47 of the fish hook by pushing the knot toward eye 46, as illustrated in FIG. 9. FIG. 10 shows the final knot-fish hook relationship. Excess line may be cut off, as at 50.

FIGS. 11 through 13 illustrate an alternate usage of the FIG. 1 device, useful for attaching a gut leader (or line) to a snelled hook 31. Initially the line 46 is run through the eye 47A of the hook. The hook is then positioned on the mandrel as shown in FIG. 11; the shank area of the hook is received within groove 36, while the eye area of the hook is anchored in one of the transverse grooves 27 in face 25. The user's thumb holds hook 31 in place on the mandrel body.

Line 46 is run through groove 36 and then wound around the mandrel body in the previously described fashion; the user's index finger is used in combination with transverse depression 35 to keep the line from unwinding. As seen in FIG. 12, the tail end 48 of the line may be inserted in a left-to-right direction through groove 36 and windings 49, after which the line can be drawn upwardly and rightwardly. As the line end 48 is pulled in this direction, the line is allowed to slip between the helical windings 49 and the mandrel, and the line comes out the bottom of the mandrel at point 39. While maintaining finger pressure on the helical windings 49, with a downward pull away from the device, the knot is drawn off the mandrel onto the shank of the fish hook. Subsequently, the knot may be pushed along the shank area of the hook to the condition of FIG. 14. The process is similar to that depicted in FIG. 9. There is provided a knot which is different and stronger than the knots of the prior art.

FIGS. 15 through 18 illustrate usage of the FIG. 1 device for tying two lines 46 and 52 together. Initially line 46 is wound around line 52 to form a knot 49; the process is similar to that depicted in FIGS. 5 through 8. The mandrel body is then turned end-for-end to permit line 52 to be wound around line 46; FIG. 18 shows the condition prior to formation of the second knot. Line 52 is wound around line 46 to form a second knot 49a (FIG. 19). The two knots can be moved together to the FIG. 20 condition by applying pull forces on tail ends 48 and 48a of the two lines.

The double knot relationship of FIG. 20 forms a strong connection between two lines. Alternately the two lines may be connected by a single knot connection, provided some additional operations are utilized. FIGS. 21 and 22 show a single knot connection. FIG. 23 shows the same connection after applying a light coat of epoxy adhesive on the knot and winding thread 56 onto the still uncured epoxy film. A final coat of epoxy 58 is applied over thread 56 to provide the connection shown in FIG. 24.

The drawings show one embodiment of the invention. Some structural variations may be utilized while still practicing the invention. Important features of the invention are the transverse depression 35 and longitudinal groove 36. The depression is located near the tip of the mandrel, such that the line is wound at a point proximate to the mandrel tip; the depression keeps the winding on the mandrel while at the same time having the winding near the tip of the mandrel where it can be easily drawn off the mandrel surface. The angulation and location of groove 36 is important in locating and guiding the tail end of the line relative to the helical winding.

I claim:

1. A line tying device comprising an elongated mandrel body having a first palm-engageable section formed with curved side surfaces, a second thumb-engageable section extending axially from the first section, and a convergent nose section extending axially from the thumb-engageable section, a longitudinal groove in the nose section, said groove having a bottom surface that angles acutely from the undersurface of the nose section to the upper face of the thumb-engageable section, and a relatively wide shallow transverse depression in the upper face of the nose section, whereby the tail end of a line can be angled downwardly through the longitudinal groove, then wrapped a number of times around the nose section and associated depression, and then extended through the longitudinal groove into the space within the wrapped sections of the line.

2. The line tying device of claim 1 wherein the upper face of said thumb-engageable section is flat.

3. The line tying device of claim 2 wherein the flat upper face of the thumb-engageable section has a plural number of closely-spaced transverse grooves adapted to facilitate frictional retention of a line on the flat face.

4. The line tying device of claim 1 wherein the bottom surface of the longitudinal groove is angled to the upper face of the thumb-engageable section at about seventeen degrees.

5. The line tying device of claim 1 wherein the transverse depression extends to a depth that is about one half the transverse thickness of the nose section.

6. The line tying device of claim 1 wherein the bottom surface of the longitudinal groove terminates at a point on the nose section undersurface that is within the general plane of the transverse depression.

7. The line tying device of claim 1 wherein the palm-engageable section has a circular cross-section.

8. The line tying device of claim 1 wherein the transverse depression has an arcuate concave bottom surface that merges smoothly into the surface contour on the convergent nose section.

9. The line tying device of claim 1 wherein the bottom surface of the longitudinal groove has a length that is several times the groove depth.

10. The line tying device of claim 1 and further comprising a fish hook-engagement ring structure carried on the elongated body remote from the convergent nose section, whereby a fish hook can be positioned alongside the elongated body for connection to a fishline prior to a line-tying operation.

11. The line tying device of claim 10 wherein the ring structure is swingably connected to the elongated body for movement to a position lying against said body, such that the shank area of the fish hook can extend parallel to the longitudinal axis of the elongated body.

12. A device for tying a line to an eye of a fish hook, comprising an elongated mandrel body having a first palm-engageable section defining the body axis, a second thumb-engageable section extending axially from the first section, and a convergent nose section extending axially from the thumb-engageable section, a longitudinal groove in the nose section, said groove having a bottom surface extending at an acute angle to the body axis, and a shallow transverse depression in the upper face of the convergent nose section, said depression being wide enough to accommodate several wrap-around sections of a line during a tying operation, said thumb-engageable section having a flat upper face, said flat upper face having at least one transverse groove therein adapted to accommodate therein the eye of a fish hook.

13. The device of claim 12 wherein the longitudinal groove has a width sufficient to receive therein the shank area of a fish hook and a line, whereby the line can simultaneously be wrapped around the shank area of the fish hook and the convergent nose section.

14. The device of claim 13 wherein the longitudinal groove has a depth sufficient to receive the tail end of a line after the line has been wrapped around the convergent nose section, whereby the tail end of the line can be pulled to draw the wrapped section of the line off the convergent nose section onto the shank area of the fish hook.

* * * * *